(12) United States Patent
Cancel Olmo et al.

(10) Patent No.: US 11,079,842 B2
(45) Date of Patent: *Aug. 3, 2021

(54) IMAGE STREAM SWITCHER

(71) Applicant: INTEL CORPORATION, Santa Clara, CA (US)

(72) Inventors: Ramon C. Cancel Olmo, Hillsboro, OR (US); Dong Yeung Kwak, San Jose, CA (US)

(73) Assignee: INTEL CORPORATION, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/881,494

(22) Filed: May 22, 2020

(65) Prior Publication Data
US 2020/0285313 A1 Sep. 10, 2020

Related U.S. Application Data

(63) Continuation of application No. 15/382,944, filed on Dec. 19, 2016, now Pat. No. 10,691,201.

(51) Int. Cl.
*G06F 3/01* (2006.01)
*H04N 5/268* (2006.01)
(Continued)

(52) U.S. Cl.
CPC ........... *G06F 3/013* (2013.01); *G02B 27/017* (2013.01); *G06F 3/00* (2013.01); *G06T 11/60* (2013.01); *H04N 5/268* (2013.01)

(58) Field of Classification Search
CPC ....... G02B 27/017; G06F 3/011; G06F 3/013; H04N 5/268
See application file for complete search history.

(56) References Cited

U.S. PATENT DOCUMENTS 6,111,580 A 8/2000 Kazama et al.
6,248,590 B1 6/2001 Malachowski
(Continued)

OTHER PUBLICATIONS

United States Patent and Trademark Office, "Non-Final Office Action," issued in connection with U.S. Appl. No. 15/382,944, dated May 19, 2017, 29 pages.
(Continued)

*Primary Examiner* — Paulos M Natnael
(74) *Attorney, Agent, or Firm* — Hanley, Flight & Zimmerman, LLC (57) ABSTRACT

The system for image stream switching may include a processor, a display, and a storage. The system storage includes instructions that when executed on the processor, cause the processor to provide, to the display, a first image stream from a data comprising multiple simultaneous image streams comprising the first image stream and a second image stream, the first image stream comprising a first setting, the second image stream comprising a second setting distinct from the first setting. The example system includes a storage with instructions that when executed detect a signal to switch from the first setting to a third setting that is numerically between the first setting and the second setting. The example system includes a storage with instructions that when executed provide, to the display, a third stream generated from alternating frames from the first stream and the second stream.

13 Claims, 6 Drawing Sheets

(51) Int. Cl.
  *G02B 27/01* (2006.01)
  *G06F 3/00* (2006.01)
  *G06T 11/60* (2006.01)

(56) References Cited

U.S. PATENT DOCUMENTS

| | | | |
|---|---|---|---|
| 8,031,258 B2 | 10/2011 | Enge et al. | |
| 8,266,333 B1 | 9/2012 | Wade et al. | |
| 8,333,475 B2 | 12/2012 | Sugio et al. | |
| 8,416,339 B2 | 4/2013 | Enge et al. | |
| 8,624,960 B2* | 1/2014 | Unkel | G02B 30/25 348/46 |
| 9,350,932 B2 | 5/2016 | Shao et al. | |
| 9,386,257 B2 | 7/2016 | Shao et al. | |
| 9,532,013 B1 | 12/2016 | McCusker et al. | |
| 10,085,068 B2 | 9/2018 | Iwami et al. | |
| 10,691,201 B2* | 6/2020 | Cancel Olmo | H04N 5/23296 |
| 2002/0103918 A1* | 8/2002 | Miller | G11B 27/034 709/231 |
| 2003/0085996 A1 | 5/2003 | Horiguchi | |
| 2005/0212955 A1* | 9/2005 | Craig | H04N 5/232 348/362 |
| 2007/0081796 A1* | 4/2007 | Fredlund | G03B 31/06 386/225 |
| 2008/0084486 A1 | 4/2008 | Enge et al. | |
| 2011/0136093 A1 | 6/2011 | Ko et al. | |
| 2011/0170065 A1 | 7/2011 | Sugio et al. | |
| 2011/0261204 A1 | 10/2011 | Smith | |
| 2011/0310279 A1 | 12/2011 | Enge et al. | |
| 2011/0314093 A1 | 12/2011 | Sheu et al. | |
| 2012/0026157 A1* | 2/2012 | Unkel | H04N 13/356 345/419 |
| 2013/0073775 A1 | 3/2013 | Wade et al. | |
| 2013/0212606 A1 | 8/2013 | Kannan et al. | |
| 2014/0064578 A1 | 3/2014 | Choe | |
| 2014/0085437 A1* | 3/2014 | Unkel | G09G 3/003 348/54 |
| 2014/0204235 A1 | 7/2014 | Wexler et al. | |
| 2014/0354515 A1 | 12/2014 | Lavalle et al. | |
| 2015/0049249 A1 | 2/2015 | Shoa et al. | |
| 2015/0049250 A1 | 2/2015 | Shoa et al. | |
| 2015/0061973 A1 | 3/2015 | Park et al. | |
| 2015/0116547 A1 | 4/2015 | Laroia | |
| 2015/0185503 A1 | 7/2015 | Tate et al. | |
| 2015/0189161 A1 | 7/2015 | Chun et al. | |
| 2015/0243067 A1 | 8/2015 | Ishikawa et al. | |
| 2015/0264296 A1* | 9/2015 | Devaux | H04N 9/8205 386/226 |
| 2015/0335288 A1 | 11/2015 | Toth et al. | |
| 2016/0011420 A1 | 1/2016 | Jang et al. | |
| 2016/0196098 A1 | 7/2016 | Roth et al. | |
| 2016/0241784 A1 | 8/2016 | Baek et al. | |
| 2016/0309081 A1 | 10/2016 | Frahm et al. | |
| 2016/0328881 A1 | 11/2016 | Ozeki | |
| 2017/0045797 A1* | 2/2017 | Yamamoto | A41D 25/00 |
| 2017/0359577 A1 | 12/2017 | Park et al. | |
| 2018/0004478 A1 | 1/2018 | Chen | |
| 2019/0286406 A1* | 9/2019 | Chen | G02B 27/017 |

OTHER PUBLICATIONS

United States Patent and Trademark Office, "Non-Final Office Action," issued in connection with U.S. Appl. No. 15/382,944, dated Dec. 6, 2017, 37 pages.

United States Patent and Trademark Office, "Non-Final Office Action," issued in connection with U.S. Appl. No. 15/382,944, dated Jul. 12, 2018, 13 pages.

United States Patent and Trademark Office, "Final Office Action," issued in connection with U.S. Appl. No. 15/382,944, dated Jan. 10, 2019, 19 pages.

United States Patent and Trademark Office, "Non-Final Office Action," issued in connection with U.S. Appl. No. 15/382,944, dated Jun. 27, 2019, 17 pages.

United States Patent and Trademark Office, "Final Office Action," issued in connection with U.S. Appl. No. 15/382,944, dated Dec. 11, 2019, 22 pages.

United States Patent and Trademark Office, "Notice of Allowance and Fee(s) Due," issued in connection with U.S. Appl. No. 15/382,944, dated Feb. 20, 2020, 5 pages.

\* cited by examiner

IMAGE STREAM SWITCHER

RELATED APPLICATION

The present application is a continuation of U.S. patent application Ser. No. 15/382,944, filed Dec. 19, 2016, which is incorporated herein by reference.

TECHNICAL FIELD

The present techniques relate generally to the display of image streams. More specifically, the present techniques relate to providing multiple image streams of the same image with varied image stream characteristics.

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

In this disclosure, a scene, an item, or other content for display may be filmed as multiple simultaneous image streams of input data, where each stream of input data may include different settings. The content for display may be displayed through virtual reality hardware, augmented reality hardware, projection, and/or other formats. The different settings for each of the multiple simultaneous image streams may include variations in focal lengths of the lens focus setting, film speeds, apertures, color balance, f-stops, or other settings of input on a camera.

The multiple simultaneous image streams may have been recorded simultaneously from the same point or relatively the same point with different focal lengths. Each stream of the multiple simultaneous image streams may have a point of focus that is fixed at a given distance, or stop, and varies from other streams. The recording of multiple simultaneous image streams with different settings like focal lengths may be accomplished, as disclosed herein, with light field camera technology. Light field cameras may be capable of shooting the same picture at different apertures or stops, providing an array of still pictures that can be manipulated with software. In addition to still images, light field cameras recording video may allow for multiple parallel video streams with different settings like focal length for post processing and display for a user.

The display may be a heads-up display (HUD) and the multiple simultaneous image streams may include 360 degree video. The multiple simultaneous image streams may also include 360 degree light field content where each of the multiple simultaneous 360 degree image streams may be set to a different focal length. The use of various streams of various focal length in a HUD display may allow a viewer to see items at multiple focal lengths in response to viewer gaze direction and depth of gaze. A HUD may detect a user's intent to focus on an item that is further away, and may switch from a stream with a shorter focal distance length to one of the multiple simultaneous image streams showing the stream of the same setting and time, but with the altered setting of more focus on distant item in focus.

Concurrent 360° video streams may be consumed by a HUD that may have the ability to toggle between different streams at different camera stops or points of focus. The toggling between different streams may be based on a detected depth of the gaze. Eye tracking may be done through detection of eye movement including, for example, gaze direction to aid in identifying an object that a user has focused on. The eye's focal direction may be associated with a line of sight and may pass through or near an object of interest to the user. In response to detecting a user's gaze direction, the processor may determine that an object intersects with the gaze direction. A user gaze direction intersecting with an object may result in focal length of view being set to bring the intersecting object into focus for the viewer. In response to detecting a desired focal length, the image stream may switch from a first image stream with a first focal length to a second image stream with a second focal length closer to the desired focal length of view. Toggling between image streams in a display using multiple simultaneous image streams may reduce the bandwidth that would be consumed upon loading more than the desired stream of the multiple simultaneous streams.

A manual user input through a controller device may switch between streams in a multiple simultaneous streams image in response to a user input to switch between the different settings in each of the multiple simultaneous streams. The user may manually adjust a controller operated by a hand to switch from a short focal length to a long focal length to focus on something further away. The controller device may include a sensor to detect hand gestures, neck movement, accelerations, and other physical motions by the user to manually control a stream selection. A manual user input may receive input to adjust a multiple simultaneous streams image between streams with different settings including shutter speed, image sensor speed, color balance, and aperture. The sensor speed can refer to the rate at which an image is captured similar to shutter speed but implemented on an image detecting sensor.

An application using multiple simultaneous image streams may interlace frames from each of the multiple simultaneous image streams at different of focus lengths, or f-stops. Interlacing the frames from the multiple simultaneous image streams at a high frame rate may allow a viewer to interpret the average image as in focus at a desired focal length. The use of interlacing may reduce computing workload to toggle between multiple simultaneous image streams and may reduce workload of process toggled video.

Figure 1:
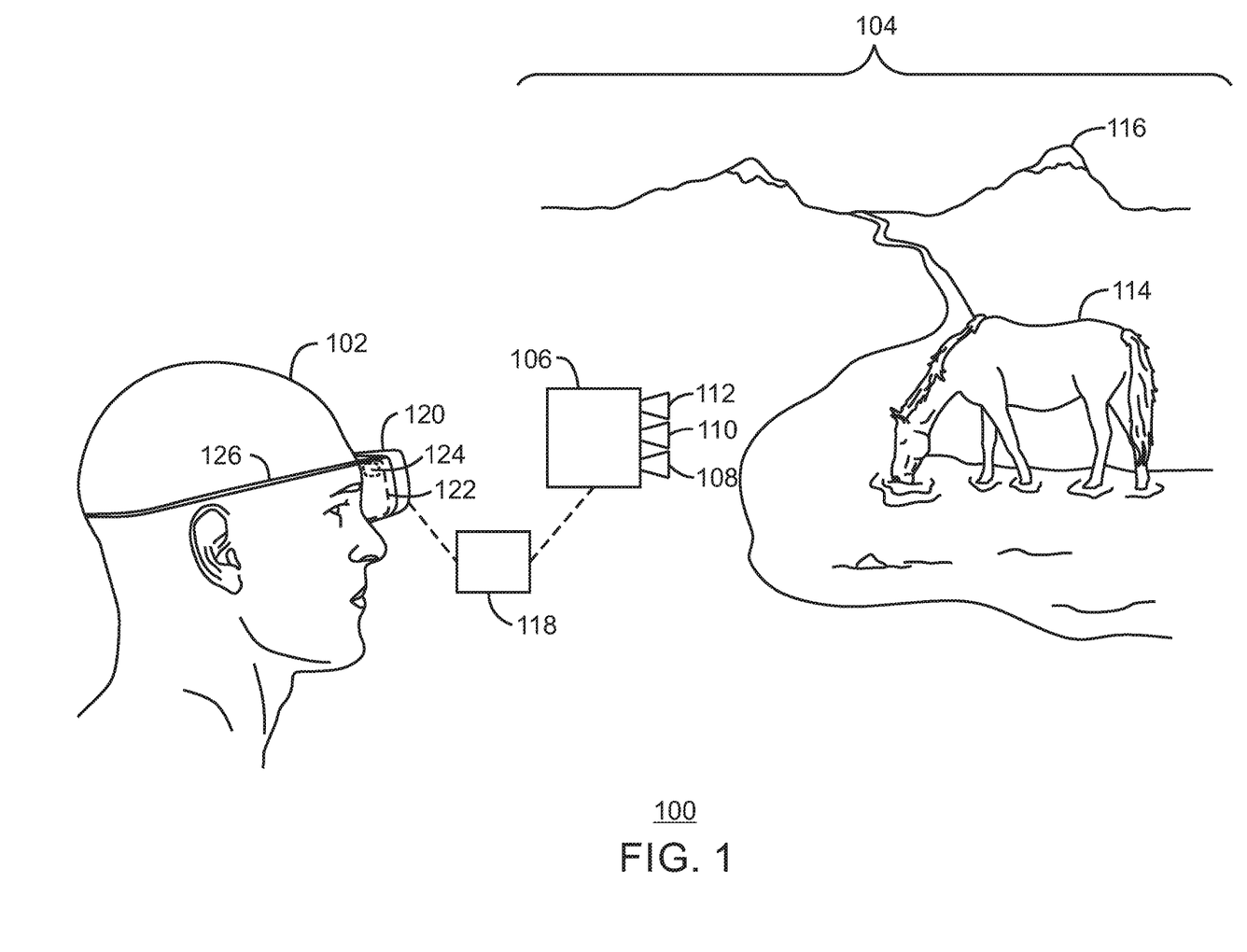
FIG. 1 is a schematic diagram of an example set-up for an image stream switcher providing multiple image streams that may be switched.

FIG. 1 is a schematic diagram of an example set-up 100 for an image stream switcher providing multiple image streams that may be switched.

A user 102 may wish to view an image 104 that has been previously recorded by a simultaneous capture camera 106. The simultaneous capture camera 106 may record the same image 104 with multiple settings at the same time. The simultaneous capture camera 106 may record an image stream in front of the simultaneous capture camera 106. The simultaneous capture camera 106 may record an image stream of a panorama of the image 104 to be recorded. The simultaneous capture camera 106 may record a 360 degree view of the image 104 to be recorded.

The multiple settings may include recording images through a first aperture 108, a second aperture 110, and a third aperture 112. The apertures may have different settings including focal length. For example, the first aperture 108 could have a focal length or f-stop to focus on a nearby object, such as the horse 114 in FIG. 1. Focusing on the horse 114, or nearby objects, with the first aperture 108 could result in blurring or unfocused input being received at the first aperture 108 from far away objects, such as the mountain 116 in FIG. 1. The same image and scene may be recorded by a second aperture 110 with a focal length or f-stop that focuses on far away objects, such as the mountain 116 in the distance. Focusing on the mountain 116, or far away objects may result in blurring or unfocused input being received at the second aperture 110 from nearby objects, such as the horse 114 in FIG. 1. While only three apertures are shown and only focal length discussed, many apertures for many settings may be used. Additionally, the inputs may use a single aperture and different capture techniques to store the multiple settings and focal lengths, so the use of apertures in FIG. 1 is for ease of explanation and example.

Once the multiple simultaneous image streams are captured, they may be stored in a storage 118. When requested for display, the storage for the multiple simultaneous streams may provide the multiple simultaneous image streams or an identified image stream of the multiple simultaneous image streams. The storage 118 may be separate, may be located in a cloud, may be part of the simultaneous capture camera 106 and/or may be part of a display holder 120.

The display holder 120 may be a HUD, a virtual reality (VR) headset, an Augmented Reality (AR) headset, a mixed reality headset, an image projecting contact lens, a mobile device used as a HUD, a television, a laptop, a tablet, a projector to project onto a projection space or into the eye of the user, and/or other types or means of providing a display 122. VR or other headsets may use a display 122 that covers a large portion of the field of view for a user. The display may be a display screen inside a HUD, may be projected, may be a virtual image seen by the user 102, or another type of display. In FIG. 1, the display holder 120 may be seen as a HUD with a display 122 held on the inside for the user 102 to view.

The availability of multiple simultaneous image streams recorded and stored in the storage 118 may allow the display 122 to alternate through video streams based on user input. As noted above, the display 112 may also display multiple image streams from the multiple simultaneous image streams through the interleaving of the image streams at a high frame rate.

The display holder 120 and the display 122 may use a sensor 124 to track head movement to adjust the content, simulating the experience of looking at a real scene. The display holder 120 may be held in place for a user 102 using a strap 126. The sensor 124 may track head movement, eye movement, eye focus distance, gaze direction, or user direction of movement. The sensor 124 may detect the eyes of a user gazing in a particular direction within the field of view of the display 122. The tracking of the gaze direction of a user 102 by the sensor 124 may be with or without head movement. Head tracking can be the result of inside-out tracking or use of external cameras or IR LEDs to improve head tracking. The focus of the eye may change based on the curvature and fold of a retina of a user, and the sensor 124 may detect this curvature and change of curvature through scanning using visual and other types of light. Based on the sensing by the sensor 124, a desired user gaze may be determined.

A sensor 124 may track the dilation of an eye of a user. A sensor 124 may track the dilation change of an eye of a user. A sensor 124 may track the dilation rate of an eye of a user. The dilation of an eye may be used as a signal for a display 122 to switch streams to a stream with a lower light level or a higher light level. A lower light level may be related to a faster shutter speed or a faster sensor speed. A higher light level may be related to a slower shutter speed or a slower sensor speed.

The eyes of a user 102 may adjust the point of focus depending on the direction of the gaze and the display 122 may switch from one image stream to another to reflect the focus of the user 102. The switching from image streams may be used to change the focus length, the lighting based on angle of vision, and other inputs disclosed above.

Figure 2:
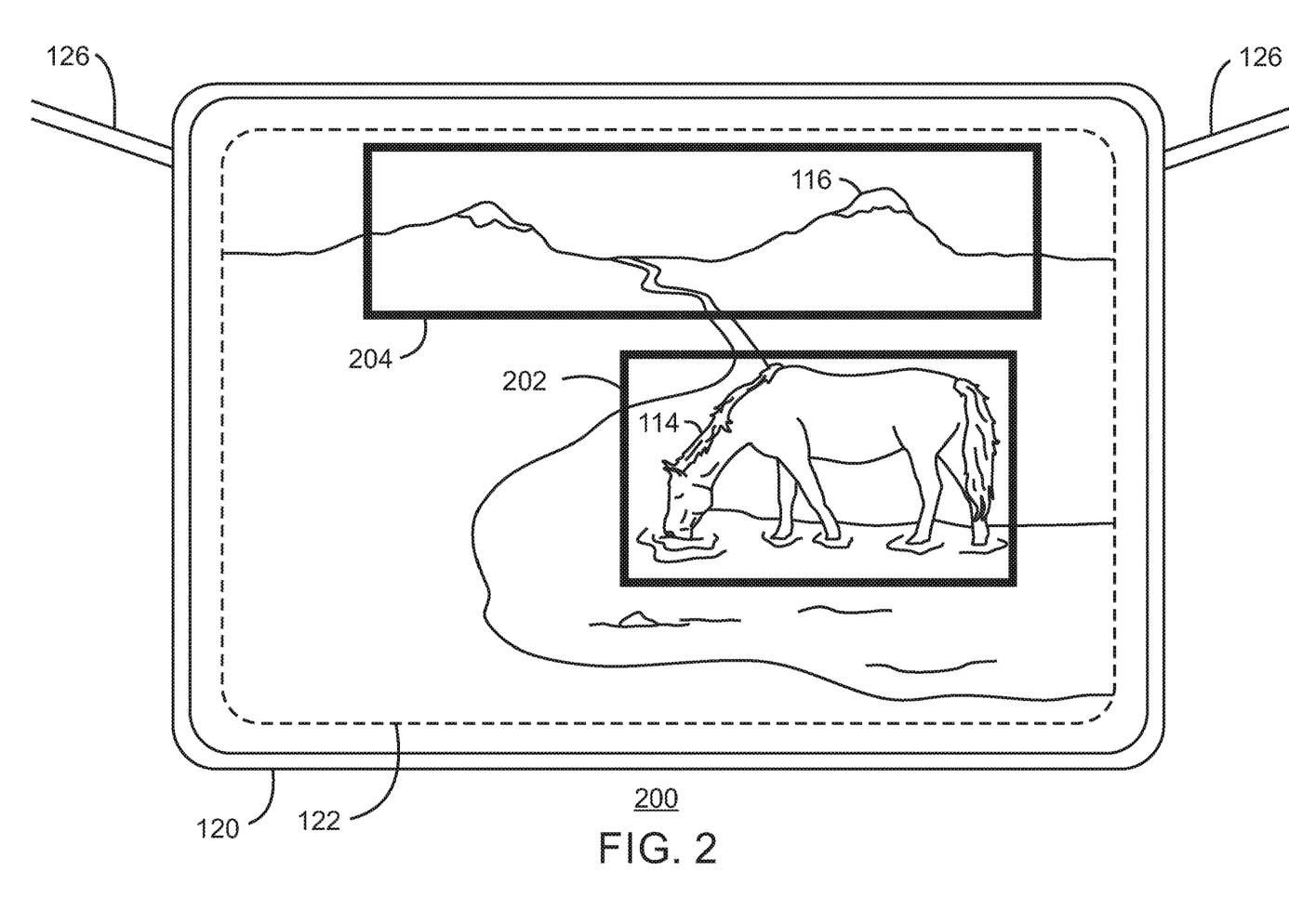
FIG. 2 is a schematic diagram of an example headset display showing streams for various focal lengths.

FIG. 2 is a schematic diagram of an example headset display 200 showing streams for various focal lengths. Like numbered items are as described with regard to FIG. 1.

FIG. 2 illustrates as an example, the same scene as FIG. 1, as observed through a display holder 120 with a display 122 to view both a near focal point 202 on the horse 114 and a far focal point 204 on the mountain 116. While only two distances are shown, many other incremental focal length streams may be used and switched between based on the vision of the user. Switching between streams may include image processing to smooth a transition between streams. In an example, image processing includes interpolating image frames. A means of transition smoothing may match eye accommodation.

A near field focal point 202 may be reported to an image stream provider used when a sensor detects that the gaze of a user aims at the horse 114 in the foreground 202. The gaze direction of the user, as sensed by the sensor, may be intersected with the location of an object identified in the display 122. The data providing the image streams may include information for identifying objects and object areas within the display. The data providing the image streams may have image data and rely on a processing unit using computer vision or object recognition software to identify regions of an image stream containing an object at a certain setting. Based on an identified area of an object, and the sensed gaze direction of a user, an intersection of the object area and the gaze direction may be used to indicate a focal length of an image stream to provide. In a display 122 showing images at a fixed distance, a sensor may match a point of focus of a point of interest and match the point of interest distance with an appropriate stream. Matching based on a matching of the point of focus and a mapped point of interest may trigger a change in the displayed optics to match a matched point of focus.

If the user gaze changes from a near field focal point 202 to a far field focal point 204, the sensor may detect the change. In response to a changed in gaze, a sensor may identify a new gaze path and signal for a switch from a first image stream with a first focal length to a second image stream with a focal length corresponding to the far field focal point 204.

Figure 3:
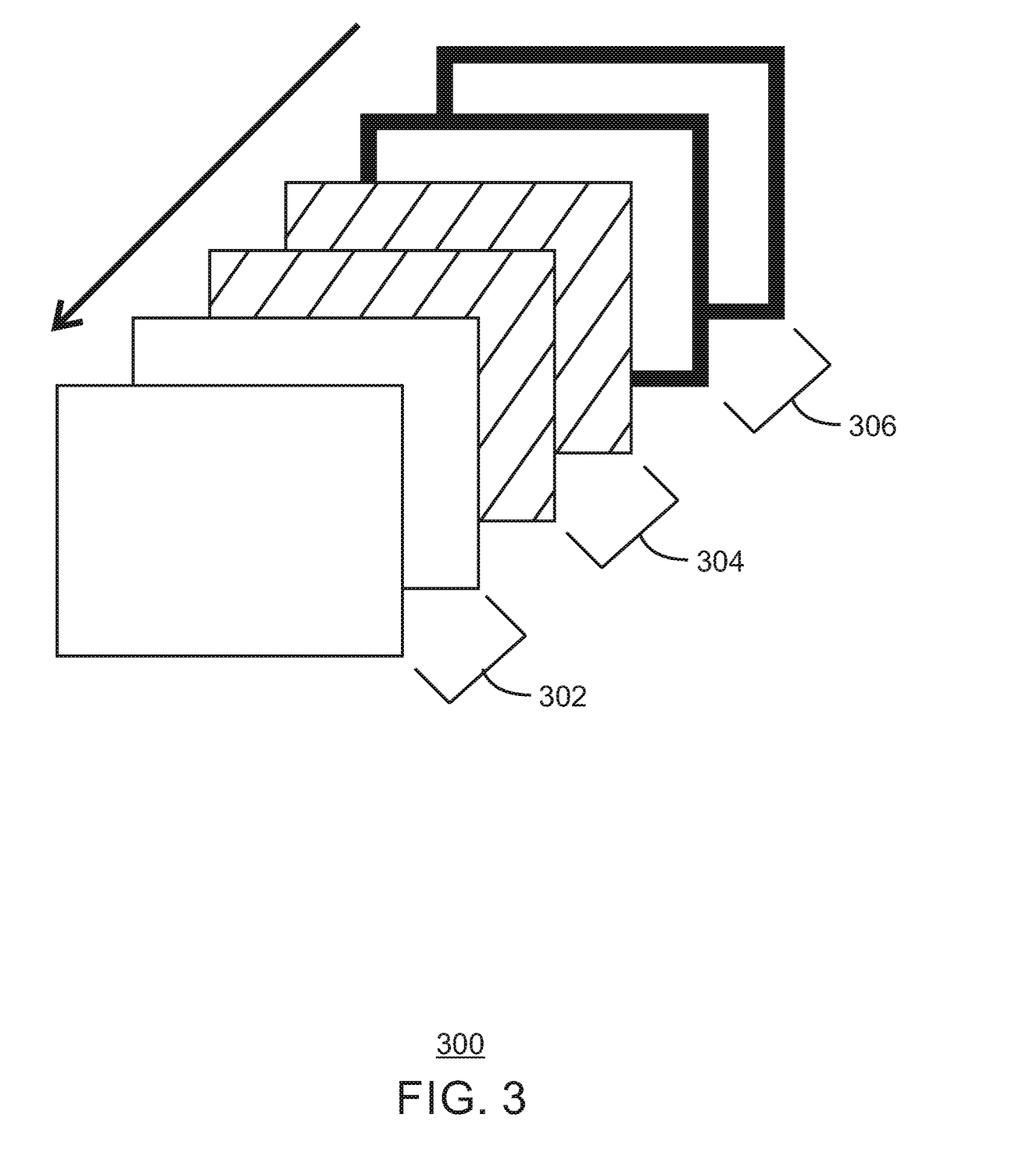
FIG. 3 is a schematic block diagram of an example of multiple frames of multiple image streams.

FIG. 3 is a schematic block diagram of an example of multiple frames 300 of multiple image streams. The arrow indicates a direction of consumption and display by a displaying device.

Video may be shown as a collection of frames shown rapidly in quick succession. The image stream for a display displaying from a data with multiple simultaneous image streams may switch from one image stream to another based on user input or instruction based on software or a sensor. With multiple frames being consumed to make a movie, the frame source may change during the image stream to the display. The near-field frames 302 may come from a near field focal point stream of a multiple simultaneous streams image. The mid-distance frames 304 may come from a mid-distance focal point stream of a multiple simultaneous streams image. The far field frames 304 may come from a far field focal point stream of a multiple simultaneous streams image. Switching between these frames in an image stream may keep the same image subject matter, but alter the particular stream, where each stream may have had different recording settings.

As discussed above, and shown in FIG. 3, the image streams may alternate or interleave to allow the brain of a user viewing the images to compose the focal length desired. These multiple video streams interleaving may include near, medium, far field frames that may be inserted at a high frame-rate.

The image streams may also allow toggling by a user input such as through a controller device operated by hand, or through gesture recognition software identifying a hand gesture of a user. The image streams for multiple simultaneous image streams may be switched according to instructions from software. A video game may use multiple simultaneous image streams to display certain cinematic effects tailored to a user position that switch the focal length of a user display based on an item or objective a game may wish to encourage the user to see or use in an interaction.

Figure 4:
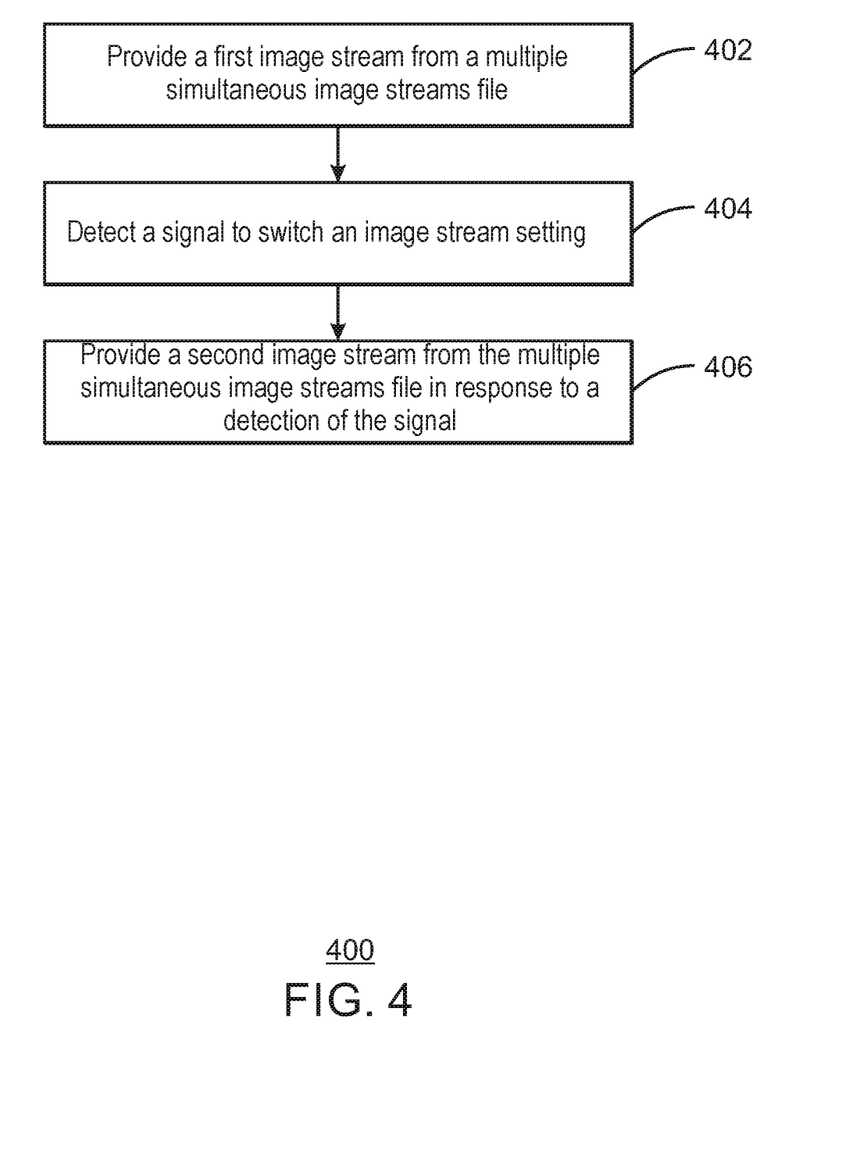
FIG. 4 is a flow chart illustrating a method for image stream switching.

FIG. 4 is a flow chart illustrating a method for image stream switching. The example method may be generally referred to by the reference number 400 and can be implemented using the system 500 of FIG. 5 below.

At block 402, a processor may provide, to a display, a first image stream from a multiple simultaneous image streams data, the first image stream including a first setting and a first frame. The display may be a component of a virtual reality headset. The multiple simultaneous image streams data may be stored within a storage of the virtual reality headset.

At block 404, a processor may determine a signal to switch an image stream setting. The signal to switch may be generated upon providing, to the display, the first frame of the first image stream. The signal to switch may be generated by a detection of at least one of a user hand gesture, a user facial gesture, or manual operation of a hardware control by the user.

At block 406, a processor may provide, to the display, a second image stream from the multiple simultaneous image streams data in response to a detection of the signal, the second image stream including a second setting and a second frame. The first setting may be a first focal length, the second setting may be a second focal length, and the image stream setting may be an image stream focal length. The signal to switch may be generated in response to a sensor detecting a gaze direction of a user intersecting with an object area. The signal to switch may be generated in response to a sensor detecting an eye focus distance of a user. The first setting may be a first sensor speed, the second setting may be a second sensor speed, and the image stream setting may be an image stream sensor speed. The signal to switch may be generated in response to a sensor detecting an eye focus dilation of a user.

Figure 5:
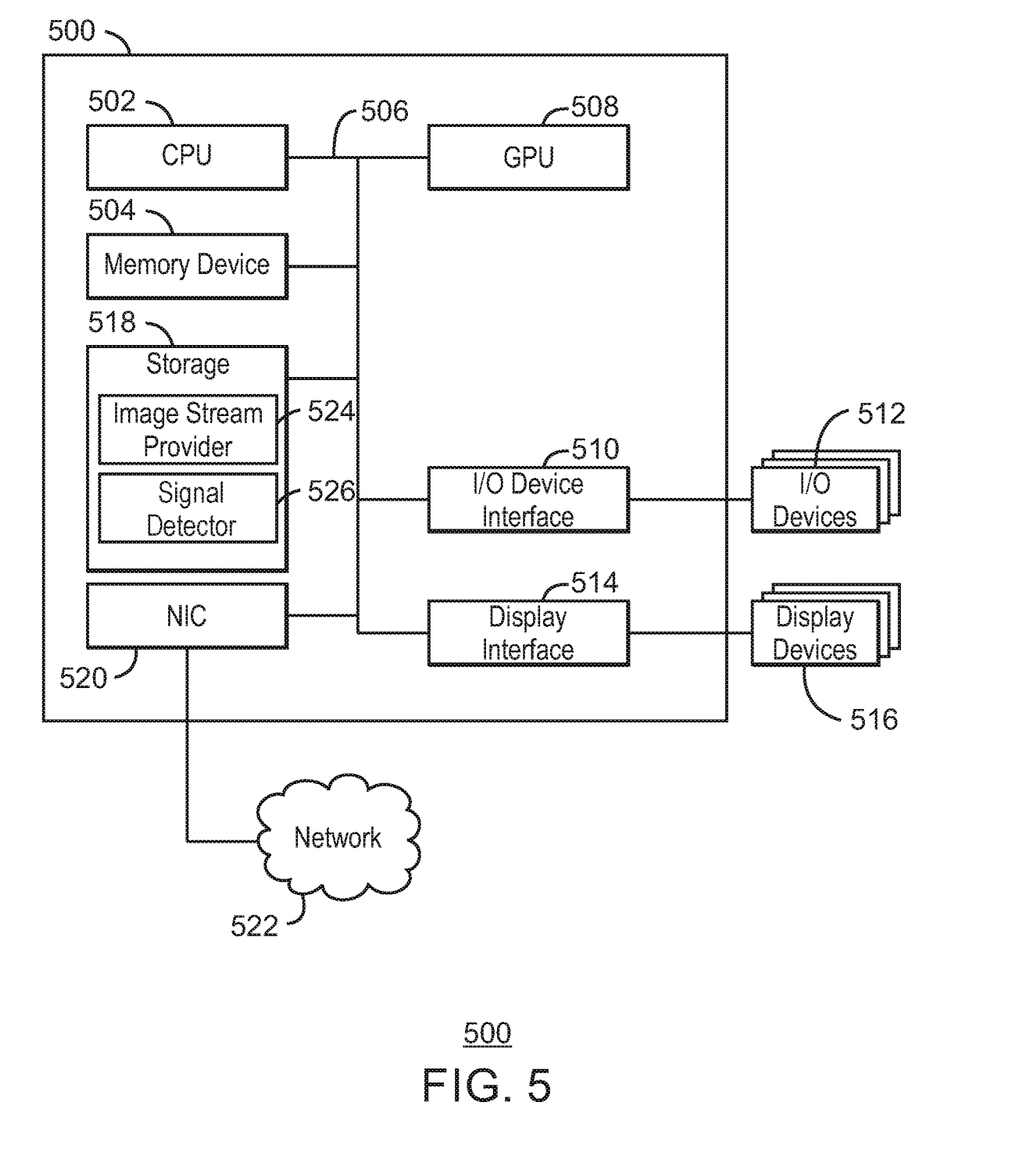
FIG. 5 is a block diagram illustrating an example computing device for image stream switching.

FIG. 5 is a block diagram illustrating an example computing device for image stream switching. The computing device 500 may be, for example, a laptop computer, desktop computer, tablet computer, mobile device, mobile phone, and/or server, among others. The computing device 500 may include a central processing unit (CPU) 502 that is configured to execute stored instructions, as well as a memory device 504 that stores instructions that are executable by the CPU 502. In some embodiments, the memory device 504 may be volatile storage. In some embodiments, the memory device 504 may be non-volatile storage. The CPU 502 may be coupled to the memory device 504 by a bus 506. Additionally, the CPU 502 can be a single core processor, a multi-core processor, a computing cluster, or any number of other configurations. Furthermore, the computing device 500 may include more than one CPU 502. The memory device 504 can include random access memory (RAM), read only memory (ROM), flash memory, or any other suitable memory systems. For example, the memory device 504 may include dynamic random access memory (DRAM).

The computing device 500 may also include a graphics processing unit (GPU) 508. As shown, the CPU 502 may be coupled through the bus 506 to the GPU 508. The GPU 508 may be configured to perform any number of graphics operations within the computing device 500. For example, the GPU 508 may be configured to render or manipulate graphics images, graphics frames, videos, or the like, to be displayed to a user of the computing device 500.

The memory device 504 can include random access memory (RAM), read only memory (ROM), flash memory, or any other suitable memory systems. For example, the memory device 504 may include dynamic random access memory (DRAM).

The CPU 502 may also be connected through the bus 506 to an input/output (I/O) device interface 510 configured to connect the computing device 500 to one or more I/O devices 512. The I/O devices 512 may include, for example, a keyboard and a pointing device, wherein the pointing device may include a touchpad or a touchscreen, among others. The I/O devices 512 may be built-in components of the computing device 500, or may be devices that are externally connected to the computing device 500. In some examples, the memory 504 may be communicatively coupled to I/O devices 512 through direct memory access (DMA). The I/O devices 512 may also be a camera for detecting displayed calibration-pattern images. The camera can be a camera detecting visible light, infrared light, or any combination of electromagnetic detectable signals.

The CPU 502 may also be linked through the bus 506 to a display interface 514 configured to connect the computing device 500 to a display device 516. The display device 516 may include a display screen that is a built-in component of the computing device 500. The display device 516 may also include a computer monitor, television, or projector, among others, that is internal to or externally connected to the computing device 500. The projector may display a stored calibration-pattern image to a projection surface.

The computing device also includes a storage device 518. The storage device 518 is a physical storage such as a hard drive, an optical drive, a flash memory device, a thumbdrive, an array of drives, or any combinations thereof. The storage device 518 may also include remote storage drives.

The computing device 500 may also include a network interface controller (NIC) 520. The NIC 520 may be configured to connect the computing device 500 through the bus 506 to a network 522. The network 522 may be a wide area network (WAN), local area network (LAN), or the Internet, among others. In some examples, the device may communicate with other devices through a wireless technology. For example, the device may communicate with other devices via a wireless local area network connection. In some examples, the device may connect and communicate with other devices via Bluetooth® or similar technology.

In an example, display device 516 can be a HUD, a VR headset, an AR headset, a mixed reality headset, an image projecting contact lens, a mobile device used as a HUD, a television, a laptop, a tablet, a projector to project onto a projection space or into the eye of the user, or other types of means of providing a display. The I/O device 512 may be a camera. In an example, the I/O device 512 may be a manual input controller, an eye motion detector, an eye dilation detector, an eye focal length detector, a mouse, or a keyboard.

The storage device 518 may include a number of modules to implement the group creation functions described herein. Although shown as code blocks in the storage device 518, it may be understood that any of the modules may be replaced with hardwired circuits, for example, built into an application specific integrated circuit (ASIC). The storage device 518 may include an image stream provider 512 to provide, to the display, a first image stream from a multiple simultaneous image streams data, the first image stream including a first setting and a first frame. The display may be a component of a virtual reality headset. The multiple simultaneous image streams data may be stored within a storage of the virtual reality headset.

The storage device 518 may include a signal detector 526 to detect a signal to switch an image stream setting. The signal to switch may be generated upon providing, to the display, the first frame of the first image stream. The signal to switch may be generated by a detection of at least one of a user hand gesture, a user facial gesture, or manual operation of a hardware control by the user.

The image stream provider 512 may provide, to the display, a second image stream from the multiple simultaneous image streams data in response to a detection of the signal, the second image stream including a second setting and a second frame. The first setting may be a first focal length, the second setting may be a second focal length, and the image stream setting may be an image stream focal length. The signal to switch may be generated in response to a sensor detecting a gaze direction of a user intersecting with an object area. The signal to switch may be generated in response to a sensor detecting an eye focus distance of a user. The first setting may be a first sensor speed, the second setting may be a second sensor speed, and the image stream setting may be an image stream sensor speed. The signal to switch may be generated in response to a sensor detecting an eye focus dilation of a user.

The block diagram of FIG. 5 is not intended to indicate that the computing device 500 is to include all of the components shown in FIG. 5. Rather, the computing device 500 can include fewer or additional components not illustrated in FIG. 5, such as additional USB devices, additional guest devices, and the like. The computing device 500 may include any number of additional components not shown in FIG. 5, depending on the details of the specific implementation. Furthermore, any of the functionalities of the CPU 502 may be partially, or entirely, implemented in hardware and/or in a processor.

Figure 6:
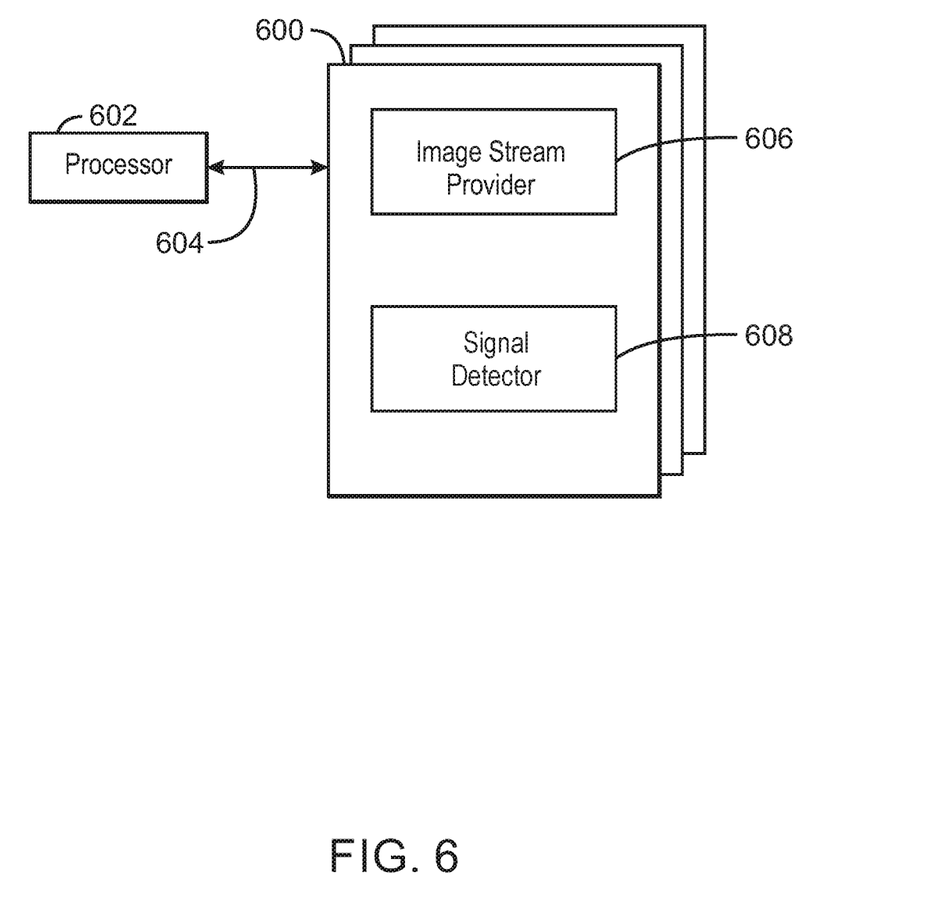
FIG. 6 is a block diagram showing computer readable media that stores code for image stream switching.

FIG. 6 is a block diagram showing computer readable media 600 that stores code for image stream switching. The computer readable media 600 may be accessed by a processor 602 over an interconnect such as, for example, a computer bus 604. Furthermore, the computer readable medium 600 may include code configured to direct the processor 602 to perform the methods described herein.

The computer readable media 600 may be non-transitory computer readable media. In some examples, the computer readable media 600 may be storage media. However, in any case, the computer readable media do not include transitory media such as carrier waves, signals, and the like.

The block diagram of FIG. 6 is not intended to indicate that the computer readable media 600 is to include all of the components shown in FIG. 6. Further, the computer readable media 600 may include any number of additional components not shown in FIG. 6, depending on the details of the specific implementation.

The various software components discussed herein may be stored on one or more computer readable media 600, as indicated in FIG. 6.

The non-transitory, machine readable medium 600 may include an image stream provider 606 to direct the processor 602 to provide, to the display, a first image stream from a multiple simultaneous image streams data, the first image stream including a first setting and a first frame. The display may be a component of a virtual reality headset. The multiple simultaneous image streams data may be stored within a storage of the virtual reality headset.

The non-transitory, machine readable medium 600 may include a signal detector 608 to direct the processor 602 to detect a signal to switch an image stream setting. The signal to switch may be generated upon providing, to the display, the first frame of the first image stream. The signal to switch may be generated by a detection of at least one of a user hand gesture, a user facial gesture, or manual operation of a hardware control by the user.

The image stream provider 606 to direct the processor 602 to direct the processor 602 to provide, to the display, a second image stream from the multiple simultaneous image streams data in response to a detection of the signal, the second image stream including a second setting and a second frame. The first setting may be a first focal length, the second setting may be a second focal length, and the image stream setting may be an image stream focal length. The signal to switch may be generated in response to a sensor detecting a gaze direction of a user intersecting with an object area. The signal to switch may be generated in response to a sensor detecting an eye focus distance of a user. The first setting may be a first sensor speed, the second setting may be a second sensor speed, and the image stream setting may be an image stream sensor speed. The signal to switch may be generated in response to a sensor detecting an eye focus dilation of a user.

The block diagram of FIG. 6 is not intended to indicate that the computer readable media 600 is to include all of the components shown in FIG. 6. Further, the computer readable media 600 may include any number of additional components not shown in FIG. 6, depending on the details of the specific implementation.

While the present techniques have been described with respect to a limited number of embodiments, those skilled in the art can appreciate numerous modifications and variations therefrom. It is intended that the appended claims cover all such modifications and variations as fall within the true spirit and scope of this present techniques.

EXAMPLES

Example 1

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a system for image stream switching, including a processor, a display, a storage including instructions that when executed on the processor, cause the processor to. The system also includes provide, to the display, a first image stream from a multiple simultaneous image streams data, the first image stream including a first setting and a first frame. The system also includes detect a signal to switch an image stream setting. The system also includes provide, to the display, a second image stream from the multiple simultaneous image streams data in response to a detection of the signal, the second image stream including a second setting and a second frame. Other embodiments of this aspect include corresponding computer systems, apparatus, and computer programs recorded on one or more computer storage devices, each configured to perform the actions of the methods.

Implementations of Example 1 may include one or more of the following features. The system where the first setting is a first focal length, the second setting is a second focal length, and the image stream setting is an image stream focal length. The system where the signal to switch is to be generated in response to matching a user point of focus and a mapped point of interest. The system where the signal to switch is to be generated in response to a sensor detecting a gaze direction of a user intersecting with an object area. The system where the first setting is a first sensor speed, the second setting is a second sensor speed, and the image stream setting is an image stream sensor speed. The system where the signal to switch is to be generated in response to a sensor detecting an eye focus dilation of a user. The system where the signal to switch is to be generated upon providing, to the display, of the first frame of the first image stream. The system where the signal to switch is to be generated by a detection of at least one of a user hand gesture, a user facial gesture, or manual operation of a hardware control by the user. The system where the display is a component of a virtual reality headset. The system where the multiple simultaneous image streams data is stored within a storage of the virtual reality headset. Implementations of the described techniques may include hardware, a method or process, or computer software on a computer-accessible medium.

Example 2

One general aspect includes a method for image stream switching including providing, to a display, a first image stream from a multiple simultaneous image streams data, the first image stream including a first setting and a first frame, detecting a signal to switch an image stream setting, and providing, to the display, a second image stream from the multiple simultaneous image streams data in response to a detection of the signal, the second image stream including a second setting and a second frame. Other embodiments of this aspect include corresponding computer systems, apparatus, and computer programs recorded on one or more computer storage devices, each configured to perform the actions of the methods.

Implementations of Example 2 may include one or more of the following features. The method where the first setting is a first focal length, the second setting is a second focal length, and the image stream setting is an image stream focal length. The method where the signal to switch is generated in response to a sensor detecting a gaze direction of a user intersecting with an object area. The method where the signal to switch is generated in response to a sensor detecting an eye focus distance of a user. The method where the first setting is a first sensor speed, the second setting is a second sensor speed, and the image stream setting is an image stream sensor speed. The method where the signal to switch is generated in response to a sensor detecting an eye focus dilation of a user. The method where the signal to switch is generated upon providing, to the display, of the first frame of the first image stream. The method where the signal to switch is generated by a detection of at least one of a user hand gesture, a user facial gesture, or manual operation of a hardware control by the user. The method where the display is a component of a virtual reality headset. The method where the multiple simultaneous image streams data is stored within a storage of the virtual reality headset. Implementations of the described techniques may include hardware, a method or process, or computer software on a computer-accessible medium.

Example 3

One general aspect includes one or more non-transitory, machine readable media including instructions that, when executed, direct a processor to provide, to a display, a first image stream from a multiple simultaneous image streams data, the first image stream including a first setting and a first frame, detect a signal to switch an image stream setting, and provide, to the display, a second image stream from the multiple simultaneous image streams data in response to a detection of the signal, the second image stream including a second setting and a second frame. Other embodiments of this aspect include corresponding computer systems, apparatus, and computer programs recorded on one or more computer storage devices, each configured to perform the actions of the methods.

Implementations of Example 3 may include one or more of the following features. The one or more non-transitory, machine readable media where the first setting is a first focal length, the second setting is a second focal length, and the image stream setting is an image stream focal length. The one or more non-transitory, machine readable media where the signal to switch is generated in response to a sensor detecting a gaze direction of a user intersecting with an object area. The one or more non-transitory, machine readable media where the signal to switch is generated in response to a sensor detecting an eye focus distance of a user. The one or more non-transitory, machine readable media where the first setting is a first sensor speed, the second setting is a second sensor speed, and the image stream setting is an image stream sensor speed. The one or more non-transitory, machine readable media where the signal to switch is generated in response to a sensor detecting an eye focus dilation of a user. The one or more non-transitory, machine readable media where the signal to switch is generated upon providing, to the display, of the first frame of the first image stream. The one or more non-transitory, machine readable media where the signal to switch is generated by a detection of at least one of a user hand gesture, a user facial gesture, or manual operation of a hardware control by the user. The one or more non-transitory, machine readable media where the display is a component of a virtual reality headset. The one or more non-transitory, machine readable media where the multiple simultaneous image streams data is stored within a storage of the virtual reality headset. Implementations of the described techniques may include hardware, a method or process, or computer software on a computer-accessible medium.

Example 4

One general aspect includes an apparatus for image stream switching including a processor, a display, a storage including instructions that when executed on the processor, cause the processor to. The apparatus also includes provide, to the display, a first image stream from a multiple simultaneous image streams data, the first image stream including a first setting and a first frame. The apparatus also includes detect a signal to switch an image stream setting. The apparatus also includes provide, to the display, a second image stream from the multiple simultaneous image streams data in response to a detection of the signal, the second image stream including a second setting and a second frame. Other embodiments of this aspect include corresponding computer systems, apparatus, and computer programs recorded on one or more computer storage devices, each configured to perform the actions of the methods.

Implementations of Example 4 may include one or more of the following features. The apparatus where the first setting is a first focal length, the second setting is a second focal length, and the image stream setting is an image stream focal length. The apparatus where the signal to switch is to be generated in response to matching a user point of focus and a mapped point of interest. The apparatus where the signal to switch is to be generated in response to a sensor detecting a gaze direction of a user intersecting with an object area. The apparatus where the first setting is a first sensor speed, the second setting is a second sensor speed, and the image stream setting is an image stream sensor speed. The apparatus where the signal to switch is to be generated in response to a sensor detecting an eye focus dilation of a user. The apparatus where the signal to switch is to be generated upon providing, to the display, of the first frame of the first image stream. The apparatus where the signal to switch is to be generated by a detection of at least one of a user hand gesture, a user facial gesture, or manual operation of a hardware control by the user. The apparatus where the display is a component of a virtual reality headset. The apparatus where the multiple simultaneous image streams data is stored within a storage of the virtual reality headset. Implementations of the described techniques may include hardware, a method or process, or computer software on a computer-accessible medium.

Example 5

One general aspect includes a system for image stream switching including a means for processing to provide, to a means for displaying, a first image stream from a multiple simultaneous image streams data, the first image stream including a first setting and a first frame, and the means for processing to detect a means for signaling to switch an image stream setting, and provide, to the means for displaying, a second image stream from the multiple simultaneous image streams data in response to a detection of the means for signaling, the second image stream including a second setting and a second frame. Other embodiments of this aspect include corresponding computer systems, apparatus, and computer programs recorded on one or more computer storage devices, each configured to perform the actions of the methods.

Implementations of Example 5 may include one or more of the following features. The system where the first setting is a first focal length, the second setting is a second focal length, and the image stream setting is an image stream focal length. The system where the means for signaling to switch is to be generated in response to matching a user point of focus and a mapped point of interest. The system where the means for signaling to switch is to be generated in response to a means for sensing detecting a gaze direction of a user intersecting with an object area. The system where the first setting is a first means for sensing speed, the second setting is a second means for sensing speed, and the image stream setting is an image stream means for sensing speed. The system where the means for signaling to switch is to be generated in response to a means for sensing detecting an eye focus dilation of a user. The system where the means for signaling to switch is to be generated upon providing, to the means for displaying, of the first frame of the first image stream. The system where the means for signaling to switch is to be generated by a detection of at least one of a user hand gesture, a user facial gesture, or manual operation of a hardware control by the user. The system where the means for displaying is a component of a virtual reality headset. The system where the multiple simultaneous image streams data is stored within a storage of the virtual reality headset. Implementations of the described techniques may include hardware, a method or process, or computer software on a computer-accessible medium.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. In yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the present techniques may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

In the foregoing specification, a detailed description has been given with reference to specific embodiments. It may be evident that various modifications and changes may be made thereto without departing from the broader spirit and scope of the present techniques as set forth in the appended claims. The specification and drawings are, accordingly, to be regarded in an illustrative sense rather than a restrictive sense. Furthermore, the foregoing use of embodiment and other language does not necessarily refer to the same embodiment or the same example, but may refer to different and distinct embodiments, as well as potentially the same embodiment.

What is claimed is:

1. A system for image stream switching, the system comprising:
   storage;
   a display;
   at least one processor to execute instructions to cause the at least one processor to at least:
      provide, to the display, a first image stream from data including the first image stream and a second image stream, the first image stream including a first setting, the second image stream including a second setting distinct from the first setting;
      detect a signal to switch from the first setting to a third setting that is numerically between the first setting and the second setting where the third setting does not exist in a stream of the data, wherein the signal to switch is generated in response to detection of at least one of a curvature of a retina of a user, a change in curvature of the retina of the user, a dilation of an eye of the user, a dilation rate of the eye of the user, and a movement of a head of the user determined from inside-out tracking; and
      provide, to the display, a third stream generated from alternating frames from the first stream and the second stream.

2. The system of claim 1, wherein the display is a component of a headset.

3. The system of claim 2, wherein the processor and storage are components of the headset.

4. The system of claim 1, wherein the first setting and the second setting relate to an aperture, f-stop setting, a shutter speed, a lens focus setting, a film speed, or a color balance setting.

5. The system of claim 1, wherein the first image stream and the second stream were captured from a same location.

6. The system of claim 1, wherein the first setting and the second setting are different focal lengths.

7. The system of claim 1, wherein the first setting and the second setting are different sensor capture speeds.

8. A method for image stream switching, the method comprising:
   providing, to a display, a first image stream from data including the first image stream and a second image stream, the first image stream including a first setting, the second image stream including a second setting distinct from the first setting;
   detecting a signal to switch from the first setting to a third setting that is numerically between the first setting and the second setting where the third setting does not exist in a stream of the data, wherein the signal to switch is generated in response to detection of at least one of a curvature of a retina of a user, a change in curvature of the retina of the user, a dilation of an eye of the user, a dilation rate of the eye of the user, and a movement of a head of the user determined from inside-out tracking; and
   providing, to the display, a third stream generated from interlacing frames from the first stream and the second stream.

9. The method of claim 8, wherein the first image stream and the second stream were captured from a same location.

10. The method of claim 8, wherein the first setting and the second setting are different focal lengths.

11. One or more non-transitory, machine readable media comprising instructions that, when executed, direct a processor to:
   provide, to the display, a first image stream from data including the first image stream and a second image stream, the first image stream including a first setting, the second image stream including a second setting distinct from the first setting;
   detect a signal to switch from the first setting to a third setting that is numerically between the first setting and the second setting where the third setting does not exist in a stream of the data, wherein the signal to switch is to be generated in response to a detection of at least one of a curvature of a retina of a user, a change in curvature of the retina of the user, a dilation of an eye of the user, a dilation rate of the eye of the user, and a movement of a head of the user determined from inside-out tracking; and
   provide, to the display, a third stream generated from interleaving frames from the first stream and the second stream.

12. The one or more non-transitory, machine readable media of claim 11, wherein the first setting and the second setting are different focal lengths.

13. The one or more non-transitory, machine readable media of claim 11, wherein the first setting and the second setting are different sensor capture speeds.

* * * * *